(12) United States Patent
Kanakubo

(10) Patent No.: US 12,399,660 B2
(45) Date of Patent: Aug. 26, 2025

(54) INFORMATION PROCESSING APPARATUS, INSPECTION APPARATUS, AND CONTROL METHOD

(71) Applicant: CANON KABUSHIKI KAISHA, Tokyo (JP)

(72) Inventor: Yukio Kanakubo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/408,402

(22) Filed: Jan. 9, 2024

(65) Prior Publication Data

US 2024/0231713 A1   Jul. 11, 2024

(30) Foreign Application Priority Data

Jan. 10, 2023 (JP) ................................ 2023-001486

(51) Int. Cl.
*G06F 3/12* (2006.01)
*G06T 7/00* (2017.01)

(52) U.S. Cl.
CPC .......... *G06F 3/1208* (2013.01); *G06F 3/1256* (2013.01); *G06F 3/1263* (2013.01); *G06T 7/001* (2013.01); *G06T 2207/30144* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 2013/0057603 A1* | 3/2013 | Gordon | B41J 2/01 347/5 |
| 2021/0397385 A1* | 12/2021 | Tanaka | G06F 3/1287 |
| 2022/0201150 A1 | 6/2022 | Manabe | |
| 2022/0303399 A1* | 9/2022 | Anno | G06F 3/1275 |
| 2022/0391151 A1 | 12/2022 | Matsuyama | |

FOREIGN PATENT DOCUMENTS

JP           2022092652 A      6/2022

* cited by examiner

*Primary Examiner* — Darryl V Dottin
(74) *Attorney, Agent, or Firm* — Canon U.S.A., Inc. IP Division

(57) ABSTRACT

An information processing apparatus is communicably connected via a printing apparatus to an inspection apparatus configured to perform an inspection of a print product. Upon receiving a job execution instruction from a user, the information processing apparatus transmits, to the printing apparatus, a first job for registering a reference image to be used in the inspection and a second job for printing an image corresponding to the reference image on a recording sheet. In a case where the information processing apparatus receives the job execution instruction while the inspection apparatus is inspecting a print product that is produced by the printing apparatus that has executed the second job that precedes the first job and corresponds to a job execution instruction different from the job execution instruction, the information processing apparatus does not transmit the first job until the preceding second job is completed.

16 Claims, 13 Drawing Sheets

FIG.4

JOB PROPERTIES — 0401

SUMMARY
FINISHING
IMAGE QUALITY
LAYOUT
VDP
INSPECTION

INSPECTION  ○ OFF
            ● ON  — 0402

INSPECTION SETTINGS — 0403

| DEFAULT ▼ |
| PRESET 1 |
| PRESET 2 |
| PRESET 3 |
| PRESET 4 |
| PRESET 5 |
| NEW REGISTRATION |

REFERENCE IMAGE — 0404

| NEW REGISTRATION ▼ |
| PRESET 1 |
| PRESET 2 |
| PRESET 3 |
| PRESET 4 |
| PRESET 5 |

INSPECTION OPERATION — 0405

| REGISTRATION ONLY ▼ |
| PRINTING ONLY |
| REGISTRATION & PRINTING |

0406 — [ PRINT ]

FIG.5

INSPECTION STATUS

INSPECTION_yyyy/mm/dd.pdf — 0501

INSPECTION IN PROGRESS — 0503

STOP INSPECTION — 0502

| INSPECTED: | FAIL: | DEFECT RATE: |
|---|---|---|
| 100 | 2 | 2% |

| MISALIGNMENT: | DOT: | STREAK: | ERROR: |
|---|---|---|---|
| 0 | 1 | 0 | 1 |

| SHEET No. | FRONT/BACK | MISALIGNMENT | DOT | STREAK | ERROR | INSPECTION DATE AND TIME | DETAILED DISPLAY |
|---|---|---|---|---|---|---|---|
| 22 | FRONT | PASS | PASS | PASS | FAIL | 2020/8/20 18:22:55 | DETAILS |
| 50 | BACK | PASS | FAIL | PASS | — | 2020/8/20 18:24:49 | DETAILS |
| | | | | | | | |
| | | | | | | | |
| | | | | | | | |

0504

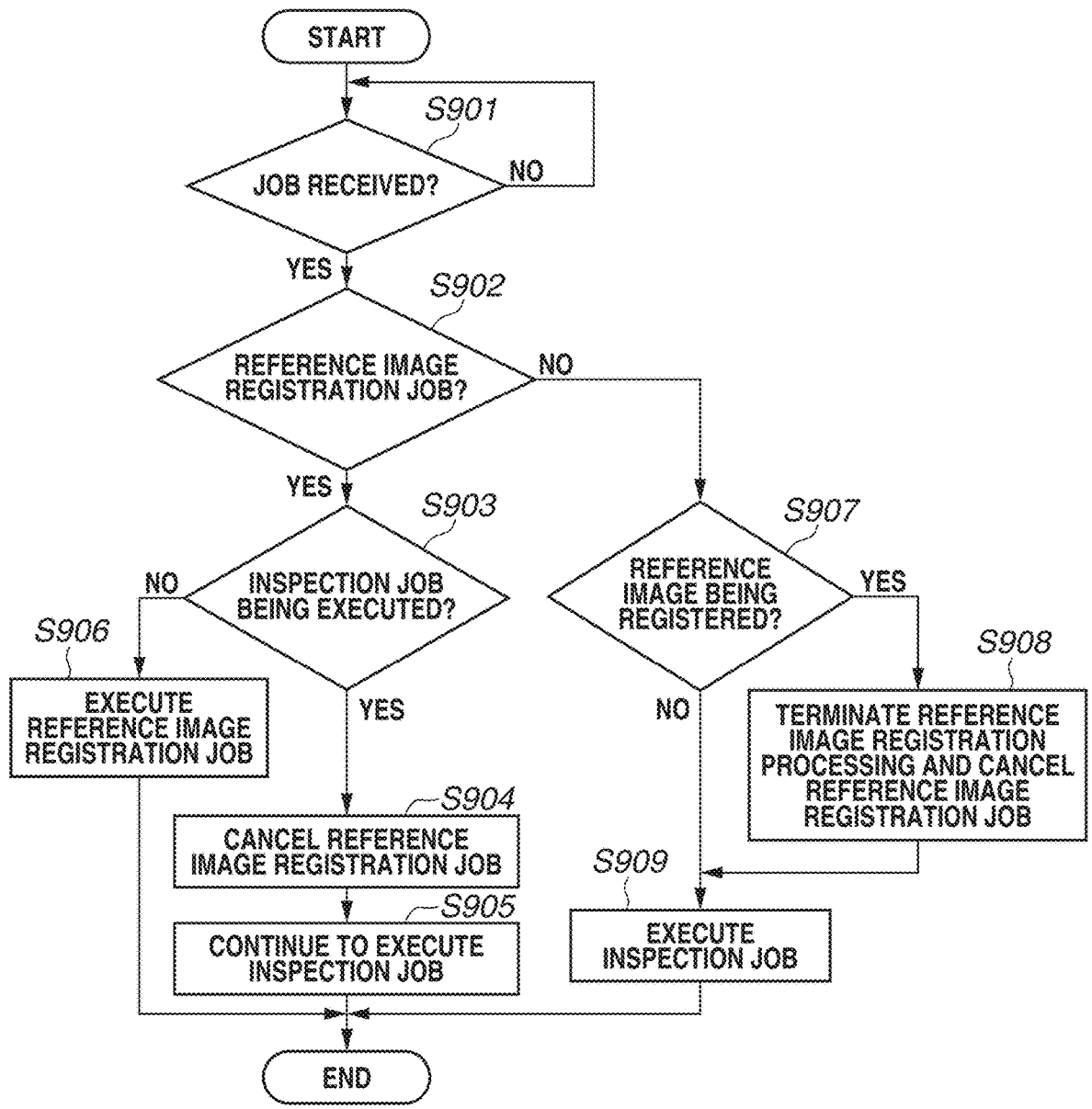

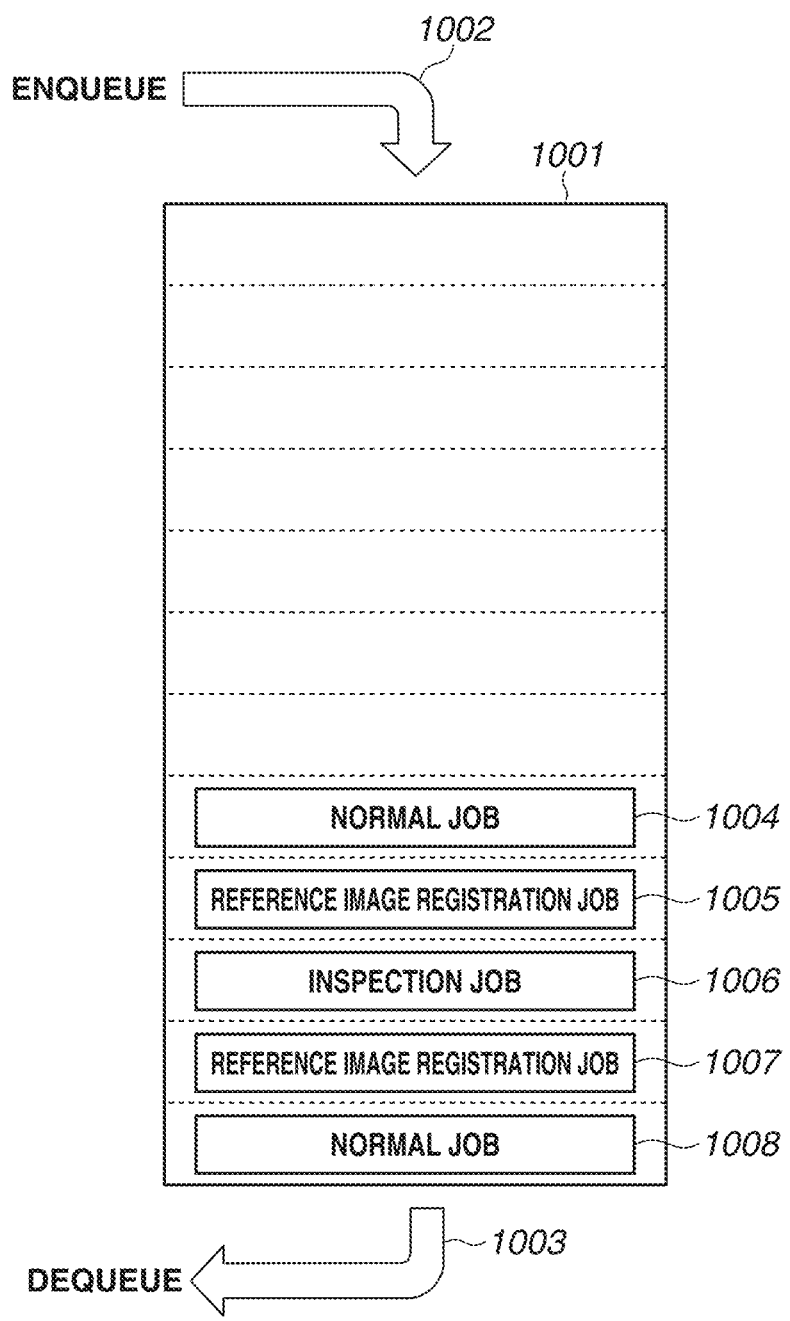

FIG.11

JOB PROPERTIES (0401)

SUMMARY
FINISHING
IMAGE QUALITY
LAYOUT
VDP
INSPECTION

INSPECTION  ○ OFF  ● ON

INSPECTION SETTINGS: DEFAULT ▼ / PRESET 1

REFERENCE IMAGE: NEW REGISTRATION ▼ / PRESET 1

1101:
[ERROR]
REFERENCE IMAGE REGISTRATION JOB HAS BEEN CANCELED DUE TO INSPECTION JOB BEING EXECUTED
[OK]

INSPECTION OPERATION: REGISTRATION ONLY ▼
PRINTING ONLY
REGISTRATION & PRINTING

[PRINT]

INFORMATION PROCESSING APPARATUS, INSPECTION APPARATUS, AND CONTROL METHOD

BACKGROUND OF THE INVENTION

Field of the Invention

The present invention relates to an information processing apparatus, an inspection apparatus, and a control method.

Description of the Related Art

There is known an inspection system that scans a print product output by a printing apparatus, and inspects the quality of the print product during conveyance of the print product to a sheet discharge tray. In the inspection, an inspection apparatus of the inspection system can detect image defects, such as stains and missing prints, typos, and barcode quality.

In the inspection, the inspection apparatus uses a method of comparing the print product with a non-defective image that is registered as a reference image. The reference image thus needs to be registered in advance with the inspection apparatus. Japanese Patent Application Laid-Open No. 2022-92652 discusses a method of registering image data as a reference image. After the registration of the reference image is completed, the user sets inspection settings for a target print job, such as a defect detection region and a defect detection threshold, with respect to the reference image. After the user completes the inspection settings, the target print job (the job to be inspected) is executed to compare an actual print product with the registered reference image for defect detection.

SUMMARY OF THE INVENTION

According to an aspect of the present invention, an information processing apparatus communicably connected via a printing apparatus to an inspection apparatus configured to perform an inspection of a print product includes an operation unit configured to receive a job execution instruction from a user, one or more processors, and one or more memories including one or more programs, wherein the one or more programs are configured to cause the one or more processors to, in a case where the operation unit receives the job execution instruction, transmit, to the printing apparatus, a first job for registering a reference image to be used in the inspection, and transmit, to the printing apparatus, a second job for printing an image corresponding to the reference image on a recording sheet. In a case where the operation unit receives the job execution instruction while the inspection apparatus is inspecting a print product that is produced by the printing apparatus that has executed the second job that precedes the first job and corresponds to a job execution instruction different from the job execution instruction, the first job is not transmitted until the preceding second job is completed by the inspection apparatus.

Further features of the present invention will become apparent from the following description of exemplary embodiments with reference to the attached drawings.

BRIEF DESCRIPTION OF THE DRAWINGS

FIG. 4 is a diagram illustrating a job properties setting screen displayed on the information processing apparatus.

FIG. 5 is a diagram illustrating an inspection status screen displayed on the inspection apparatus.

FIG. 9 is a flowchart illustrating a job execution control operation by the inspection apparatus according to a second exemplary embodiment.

FIG. 10 is a schematic diagram illustrating a job queue according to the first exemplary embodiment.

FIG. 11 is a diagram illustrating a screen displayed on the information processing apparatus when a reference image registration job is canceled according to the second exemplary embodiment.

DESCRIPTION OF THE EMBODIMENTS

Exemplary embodiments of the present invention will be described below with reference to the attached drawings. Unless otherwise specified, the exemplary embodiments can be applied to any inspection apparatus that can implement the functions according to the exemplary embodiments, regardless of whether the inspection apparatus is formed by a single device or a plurality of devices. Unless otherwise specified, the exemplary embodiments can be applied to the following configuration that can implement the functions according to the exemplary embodiments. For example, a configuration may be used in which an inspection apparatus is connected via a network, such as a local area network (LAN) or a wide area network (WAN), to perform processing. In other words, a system configuration in which various terminals are connected, which will be described in the following exemplary embodiments, is merely an example, and various example configurations are available depending on the application and purpose.

Figure 1:
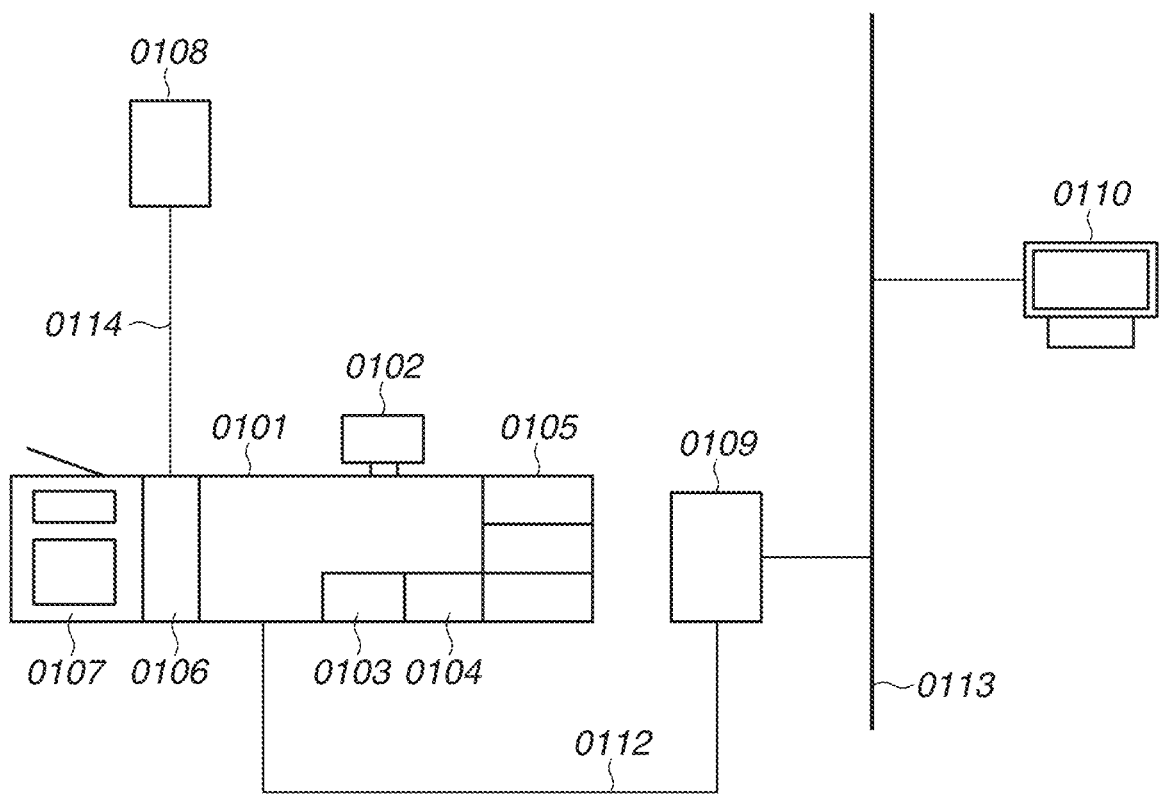
FIG. 1 is a schematic diagram illustrating a configuration of an inspection system including an information processing apparatus, an inspection apparatus, and a printing apparatus.

FIG. 1 is a schematic diagram illustrating a configuration of an inspection system according to a first exemplary embodiment. The inspection system according to the present exemplary embodiment includes an information processing apparatus 0109, an inspection apparatus 0108, and a printing apparatus 0101. The printing apparatus 0101 according to the present exemplary embodiment will be described as an electrophotographic printing apparatus as an example, but the printing apparatus 0101 according to the present exemplary embodiment may be a printing apparatus using a different image forming method, such as an inkjet method or an offset method. In the present exemplary embodiment, the printing apparatus 0101 and the inspection apparatus 0108 will be described as separate apparatuses, but the present exemplary embodiment is not limited thereto and a print inspection apparatus into which the printing apparatus 0101 and the inspection apparatus 0108 are integrated may be communicably connected to the information processing apparatus 0109 via a network.

The printing apparatus 0101 is connected to the information processing apparatus 0109 via a cable 0112. The information processing apparatus 0109 is connected to a client computer 0110 via a network 0113.

The printing apparatus 0101 includes a user interface (UI) panel 0102 and sheet feed decks 0103 and 0104. In addition, an optional deck 0105 including three sheet feed decks is connected to the printing apparatus 0101. The printing apparatus 0101 is, for example, an electrophotographic printing apparatus. The UI panel 0102 is a user interface including, for example, a capacitive touch panel.

The printing apparatus 0101 is connected to an inspection unit 0106 and a large capacity stacker 0107. The inspection unit 0106 is connected to the inspection apparatus 0108 via a cable 0114. The large capacity stacker 0107 includes a main tray 0324 and a top tray 0320 (which will be described below) and is configured to stack several thousands of sheets at a time in the main tray 0324. The large capacity stacker 0107 is also configured to discharge, based on print inspection results, print products determined as PASS and print products determined as FAIL to different trays (i.e., the main tray 0324 and the top tray 0320).

A print job is generated by the client computer 0110, transmitted to the information processing apparatus 0109 via the network 0113, and managed by the information processing apparatus 0109. The print job is then transmitted from the information processing apparatus 0109 to the printing apparatus 0101 via the cable 0112, so that the printing apparatus 0101 performs print processing on sheets. In some embodiments, a print job may be generated and managed by the information processing apparatus 0109, transmitted to the printing apparatus 0101 via a network instead of the cable 0112, and managed by the printing apparatus 0101.

In some embodiments, the client computer 0110, the information processing apparatus 0109, and the inspection apparatus 0108 may be connected to the cable 0112 to communicate with the printing apparatus 0101. In some embodiments, the inspection apparatus 0108 may be connected to the information processing apparatus 0109 and the client computer 0110 via the network 0113. In other words, the configuration in which the printing apparatus 0101, the inspection apparatus 0108, the information processing apparatus 0109, and the client computer 0110 are connected, all of which are described in the present exemplary embodiment, is merely an example, and there are various connection configurations other than that described in the present exemplary embodiment.

In some embodiments, the printing apparatus 0101 may be connected to a finisher capable of stapling, a folding machine, a bookbinding machine, or the like, in addition to the inspection unit 0106 and the large capacity stacker 0107.

While in the present exemplary embodiment, the information processing apparatus 0109 is described as a separate apparatus from the printing apparatus 0101, the inspection system may be configured such that the function of the information processing apparatus 0109 according to the present exemplary embodiment is included in the printing apparatus 0101.

Figure 2:
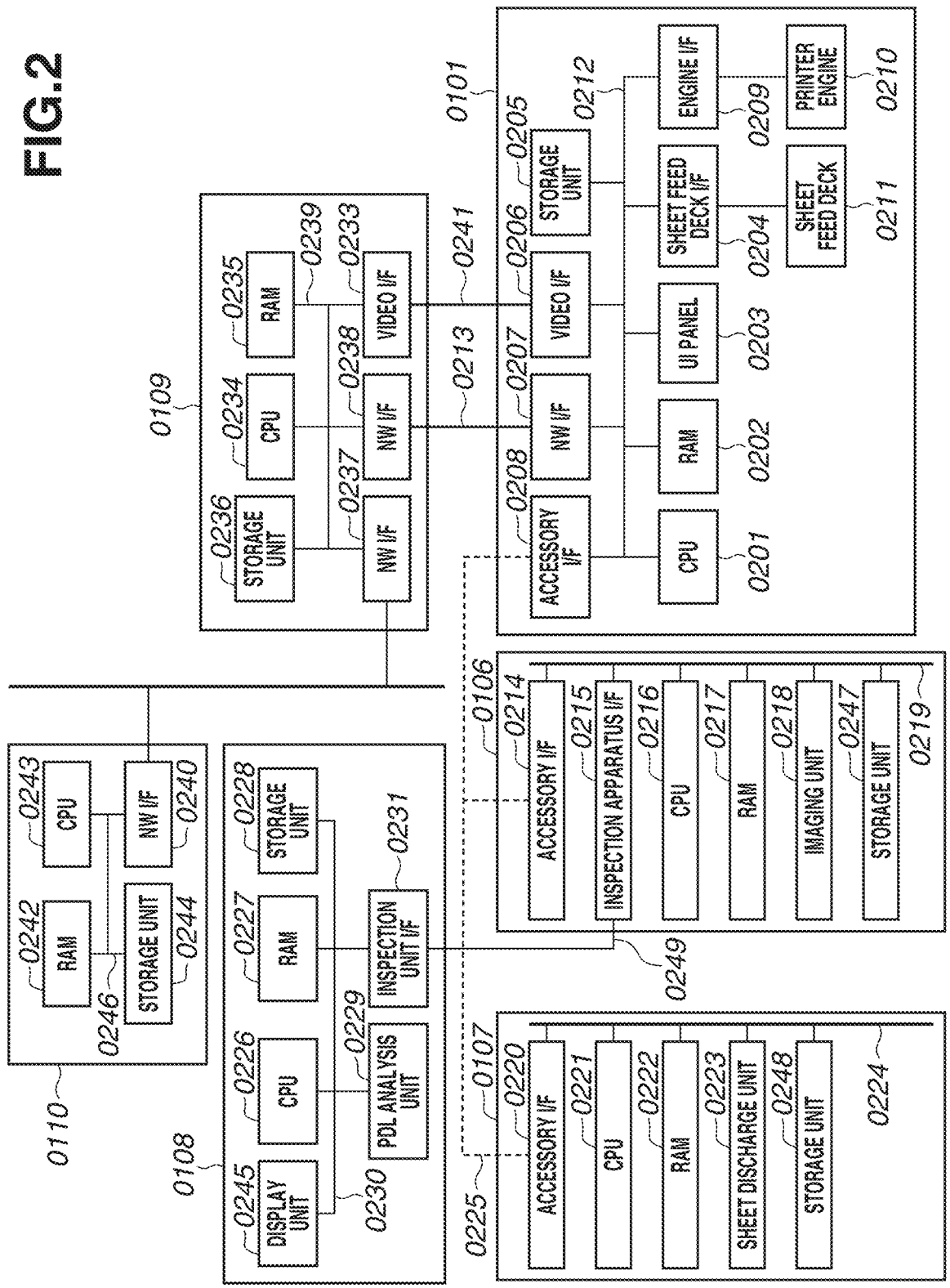
FIG. 2 is a block diagram illustrating a control configuration of the inspection system.

FIG. 2 is a block diagram illustrating a control configuration of the printing apparatus 0101, the inspection apparatus 0108, the large capacity stacker 0107, the inspection unit 0106, the information processing apparatus 0109, and the client computer 0110 according to the present exemplary embodiment.

A central processing unit (CPU) 0201 controls components (described below) of the printing apparatus 0101 via a system bus 0212 and performs arithmetic operations. The CPU 0201 executes programs loaded from a storage unit 0205 into a random-access memory (RAM) 0202. The RAM 0202 is a kind of common volatile memory that is directly accessible from the CPU 0201, and is used as a work area or other temporary data storage areas for the CPU 0201. The storage unit 0205 functions as a temporary storage area and a work memory while the printing apparatus 0101 is in operation.

An engine interface (I/F) 0209 communicates with and controls a printer engine 0210. A sheet feed deck I/F 0204 communicates with and controls a sheet feed deck 0211. Hardware configurations of the sheet feed decks 0103 and 0104 and the optional deck 0105 are collectively referred to as the sheet feed deck 0211. A UI panel 0203 corresponds to a hardware configuration of the UI panel 0102 and is a user interface for performing various operations of the printing apparatus 0101. In the present exemplary embodiment, the UI panel 0203 includes a capacitive touch panel.

A network I/F (hereinafter referred to as an NW I/F) 0207 is connected to an NW I/F 0238 of the information processing apparatus 0109 via a cable 0213 and conducts communication between the information processing apparatus 0109 and the printing apparatus 0101. While the NW I/F 0207 and the NW I/F 0238 that are connected to the system bus 0212 and a system bus 0239, respectively, are directly connected to each other in the example of FIG. 2, the information processing apparatus 0109 and the printing apparatus 0101 may be connected to each other via, for example, a network and the connection method thereof is not specifically limited. A video I/F 0206 is connected to a video I/F 0233 via a video cable 0241, and communicates image data between the information processing apparatus 0109 and the printing apparatus 0101.

While in the present exemplary embodiment, the information processing apparatus 0109 is connected to the printing apparatus 0101 via the NW I/F 0238 and the video I/F 0233, an I/F into which the functions of the NW I/F 0238 and the video I/F 0233 are integrated may be used instead of the NW I/F 0238 and the video I/F 0233. While in the present exemplary embodiment, the printing apparatus 0101 is connected to the information processing apparatus 0109 via the NW I/F 0207 and the video I/F 0206, an I/F into which the functions of the NW I/F 0207 and the video I/F 0206 are integrated may be used instead of the NW I/F 0207 and the video I/F 0206.

An accessory I/F 0208 connects to an accessory I/F 0214 and an accessory I/F 0220 via a cable 0225. In other words, the printing apparatus 0101 communicates with the inspection unit 0106 and the large capacity stacker 0107 via the accessory I/Fs 0208, 0214, and 0220.

A CPU 0216 controls components (described below) of the inspection unit 0106 via a system bus 0219, performs arithmetic operations, and executes programs loaded from a storage unit 0247 into a RAM 0217. The RAM 0217 is a kind of common volatile memory that is directly accessible from the CPU 0216, and is used as a work area or other temporary data storage areas for the CPU 0216. The storage unit 0247 functions as a temporary storage area and a work memory while the inspection unit 0106 is in operation. An inspection apparatus OF 0215 is connected to an inspection unit OF 0231 via a cable 0249. In other words, the inspection unit 0106 communicates with the inspection apparatus 0108 via the inspection apparatus OF 0215 and the inspection unit OF 0231.

An imaging unit 0218 has an imaging function using, for example, contact image sensors (CISs) 0315 and 0316 (described below), captures an image of a sheet passing through the inspection unit 0106, and transmits the captured image to the inspection apparatus 0108 via the inspection apparatus OF 0215. The CISs 0315 and 316 are an example of a sensor for the imaging unit 0218, and a different type of sensor, such as a charge-coupled device (CCD) image sensor, may be used and the imaging method of the imaging unit 0218 is not specifically limited. The purpose of transmitting a captured image in raster image processor (RIP) inspection is to capture an image of a print product of a print job to be inspected and transmit the captured image to the inspection apparatus 0108 for inspection.

A CPU 0221 controls components (described below) of the large capacity stacker 0107 via a system bus 0224, performs arithmetic operations, and executes programs loaded from a storage unit 0248 into a RAM 0222. The RAM 0222 is a kind of common volatile memory that is directly accessible from the CPU 0221, and is used as a work area or other temporary data storage areas for the CPU 0221. The storage unit 0248 functions as a temporary storage area and a work memory while the large capacity stacker 0107 is in operation. A sheet discharge unit 0223 monitors and controls the operation of discharging sheets to the main tray 0324 and the top tray 0320, and the sheet stacking states of the main tray 0324 and the top tray 0320.

A CPU 0226 controls components (described below) of the inspection apparatus 0108 via a system bus 0230, performs arithmetic operations, and executes programs loaded from a storage unit 0228 into a RAM 0227. The RAM 0227 is a kind of common volatile memory that is directly accessible from the CPU 0226, and is used as a work area or other temporary data storage areas for the CPU 0226.

The storage unit 0228 functions as a temporary storage area and a work memory while the inspection apparatus 0108 is in operation. The storage unit 0228 stores inspection settings and reference images. A page description language (PDL) analysis unit 0229 reads PDL data, such as Portable Document Format (PDF) data, PostScript data, or Printer Control Language (PCL) data, received from the client computer 0110 or the information processing apparatus 0109, and performs interpretation processing on the PDL data. A display unit 0245 is, for example, a liquid crystal display connected to the inspection apparatus 0108 and is configured to receive the user's input to the inspection apparatus 0108 and to display the status of the inspection apparatus 0108.

A CPU 0234 controls components (described below) of the information processing apparatus 0109 via the system bus 0239, performs arithmetic operations, and executes programs loaded from a storage unit 0236 into a RAM 0235. The RAM 0235 is a kind of common volatile memory that is directly accessible from the CPU 0234, and is used as a work area or other temporary data storage areas for the CPU 0234. The storage unit 0236 functions as a temporary storage area and a work memory while the information processing apparatus 0109 is in operation. An NW OF 0237 is connected to an NW OF 0240 via a network. The information processing apparatus 0109 communicates with the client computer 0110 via the NW OF 0237 and the NW OF 0240.

Alternatively, the inspection apparatus 0108 may include an NW UF, and the information processing apparatus 0109 may communicate with the inspection apparatus 0108 via the NW I/F of the inspection apparatus 0108 and the NW I/F 0237. In the present exemplary embodiment, an RIP image generated by the information processing apparatus 0109 is a source of reference image data. In this case, the RIP image may be transmitted to the inspection apparatus 0108 via the inspection apparatus I/F 0215, or may be transmitted to the inspection apparatus 0108 via the NW I/F 0237 and the NW I/F of the inspection apparatus 0108.

A CPU 0243 controls components (described below) of the client computer 0110 via a system bus 0246, performs arithmetic operations, and executes programs loaded from a storage unit 0244 into a RAM 0242. The RAM 0242 is a kind of common volatile memory that is directly accessible from the CPU 0243, and is used as a work area or other temporary data storage areas for the CPU 0243. The storage unit 0244 functions as a temporary storage area and a work memory while the client computer 0110 is in operation.

Figure 3:
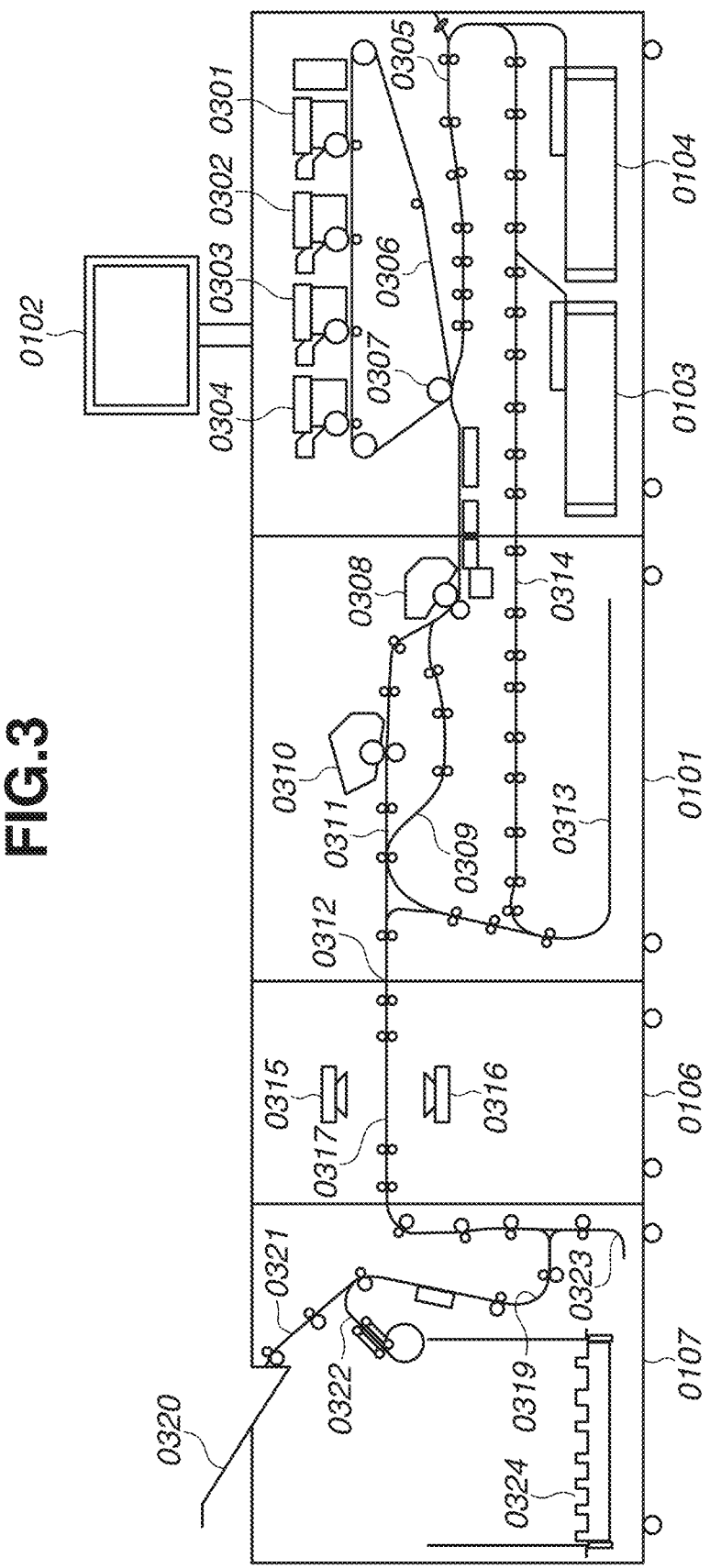
FIG. 3 is a diagram illustrating an internal configuration of the printing apparatus, an inspection unit, and a large capacity stacker.

FIG. 3 illustrates an internal configuration of the printing apparatus 0101, the inspection unit 0106, and the large capacity stacker 0107. The printing apparatus 0101 is configured to receive the user's input via the UI panel 0102 and to display the printing status and device status of the printing apparatus 0101 on the UI panel 0102. The printing apparatus 0101 can store various types of sheets in the sheet feed decks 0103 and 0104. In the present exemplary embodiment, the "sheets" are not limited to paper as long as the sheets are recording sheets on which images can be printed. In the sheet feed decks 0103 and 0104, only the uppermost sheet of the stored sheets can be separated and conveyed to a sheet conveyance path 0305. Development stations 0301, 0302, 0303, and 0304 form toner images using color toners of yellow (Y), magenta (M), cyan (C), and black (K), respectively, in order to form a full-color image. The toner images formed by the development stations 0301 to 0304 are primarily transferred to an intermediate transfer belt 0306. The intermediate transfer belt 0306 is configured to rotate in a clockwise direction in FIG. 3, and at a secondary transfer position 0307, the toner images on the intermediate transfer belt 0306 are transferred to the sheet conveyed from the sheet conveyance path 0305. A fixing unit 0308 includes a pressure roller and a heating roller and is configured to fix the toner image to the sheet by melting and pressing the toner on the sheet while passing the sheet between the rollers. The sheet having passed through the fixing unit 0308 is conveyed to a sheet conveyance path 0312 via a sheet conveyance path 0309. Depending on the sheet type, the toner may be additionally melted and pressed on the sheet for the fixing. In this case, the sheet having passed through the fixing unit 0308 is conveyed to a second fixing unit 0310 via an upper sheet conveyance path, subjected to the additional melting and pressing by the second fixing unit 0310, and conveyed to the sheet conveyance path 0312 via a sheet conveyance path 0311. In a case where the image forming mode is a duplex printing mode, the sheet is conveyed to a sheet reversing path 0313, reversed at the sheet reversing path 0313, and conveyed to a duplex conveyance path 0314, so that image transfer is performed on the second side of the sheet at the secondary transfer position 0307.

The inspection unit 0106 includes the CISs 0315 and 0316 that are arranged to oppose each other. The CIS 0315 scans the top surface of the sheet, and the CIS 0316 scans the back surface of the sheet. The inspection unit 0106 scans the sheet using the CIS 0315 and/or the CIS 0316 at timing when the sheet conveyed to a sheet conveyance path 0317 reaches a predetermined position. A scanned image obtained by scanning the sheet is transmitted to the inspection apparatus 0108 via the inspection apparatus OF 0215 and the inspection unit I/F 0231. The CPU 0226 determines whether there is a defect in the received image, and returns the determination result to the inspection unit 0106 via the inspection unit OF 0231 and the inspection apparatus OF 0215. The CPU 0216 notifies the large capacity stacker 0107 of the received determination result via the accessory I/Fs 0214 and 0220.

The large capacity stacker 0107 can stack a large number of sheets. The large capacity stacker 0107 includes the main tray 0324 as a sheet stacking tray. The sheet having passed through the inspection unit 0106 is conveyed to the large capacity stacker 0107 via a sheet conveyance path 0319. The sheet is conveyed from the sheet conveyance path 0319 to the main tray 0324 via a sheet conveyance path 0322 and is placed on the main tray 0324. The large capacity stacker 0107 also includes the top tray 0320 as a sheet discharge tray. The CPU 0221 discharges a sheet in which a defect is detected by the inspection apparatus 0108 to the top tray 0320. In the case of output of a sheet to the top tray 0320, the sheet is conveyed from the sheet conveyance path 0319 to the top tray 0320 via a sheet conveyance path 0321. A reversing portion 0323 is configured to reverse a sheet. The reversing portion 0323 is used when sheets are stacked in the main tray 0324. In the case of stacking sheets in the main tray 0324, the sheets are reversed once at the reversing portion 0323 so that the orientation of the sheets is the same between when conveyed to the large capacity stacker 0107 and when stacked on the main tray 0324. When a sheet is conveyed to the top tray 0320, the sheet is directly discharged and placed on the top tray 0320 without being flipped, and thus the reversing operation at the reversing portion 0323 is not performed.

Figure 12:
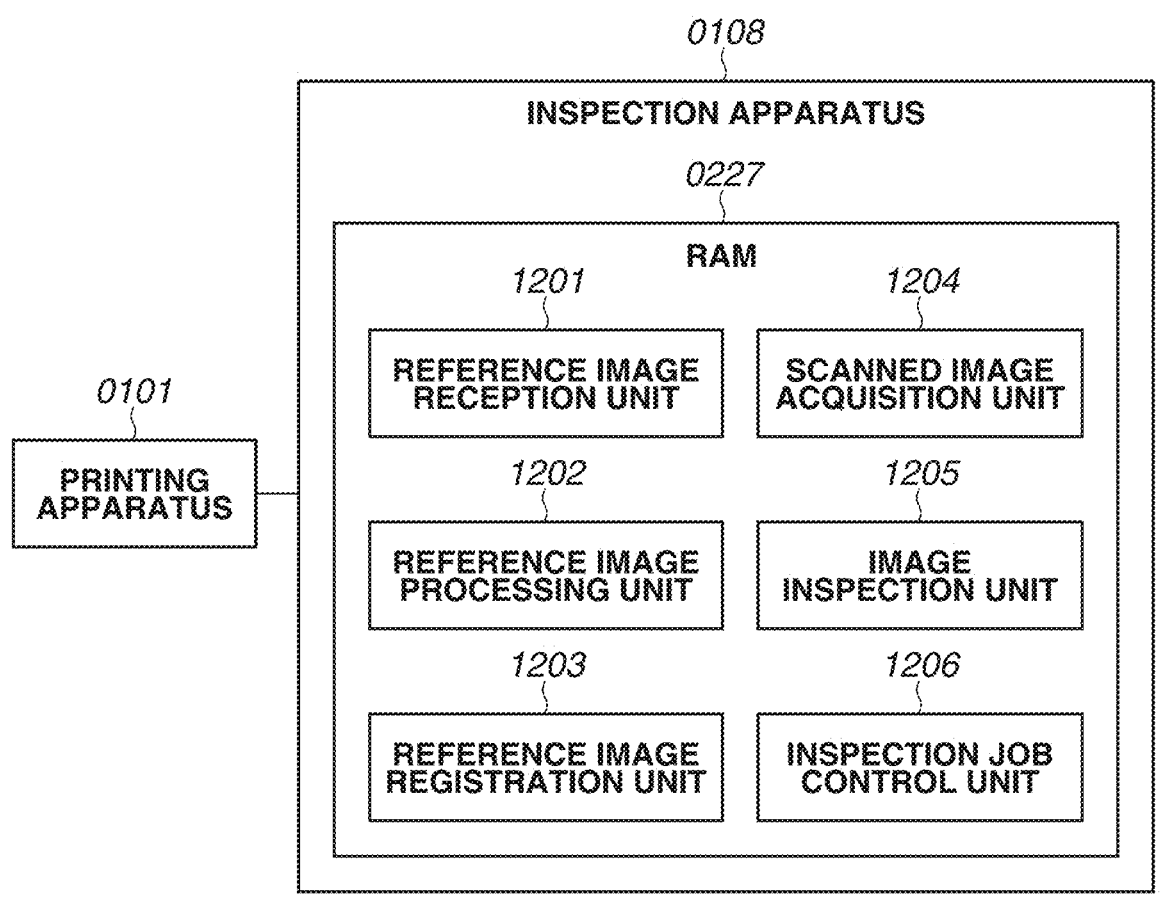
FIG. 12 is a diagram illustrating an example of a software configuration of the inspection apparatus.

FIG. 12 illustrates a software configuration of the inspection apparatus 0108 of the inspection system according to the present exemplary embodiment. The software configuration is implemented by the CPU 0226 loading programs and data stored in the storage unit 0228 into the RAM 0227 and executing the loaded programs and data.

A reference image reception unit 1201 receives an RIP image, which is a source of reference image data, transmitted from the information processing apparatus 0109 via the printing apparatus 0101.

A reference image processing unit 1202 performs image processing, such as resolution conversion and image format conversion, on the RIP image received by the reference image reception unit 1201 to generate reference image data.

A reference image registration unit 1203 stores the reference image data generated by the reference image processing unit into the storage unit 0228, together with identification information, such as a reference image identifier (ID).

A scanned image acquisition unit 1204 acquires a scanned image that is obtained by the imaging unit 0218 of the inspection unit 0106 capturing an image of a conveyed print product and scanning the captured image.

An image inspection unit 1205 performs an inspection by comparing the scanned image and a reference image. The scanned image is acquired by the scanned image acquisition unit 1204, and the reference image is stored by the reference image registration unit 1203 and corresponds to the scanned image. The image inspection unit 1205 may perform the inspection by extracting a feature amount of the scanned image and a feature amount of the reference image and comparing the extracted feature amounts.

An inspection job control unit 1206 controls the execution of a reference image registration job and an inspection job that are executed by the inspection apparatus 0108.

Figure 13:
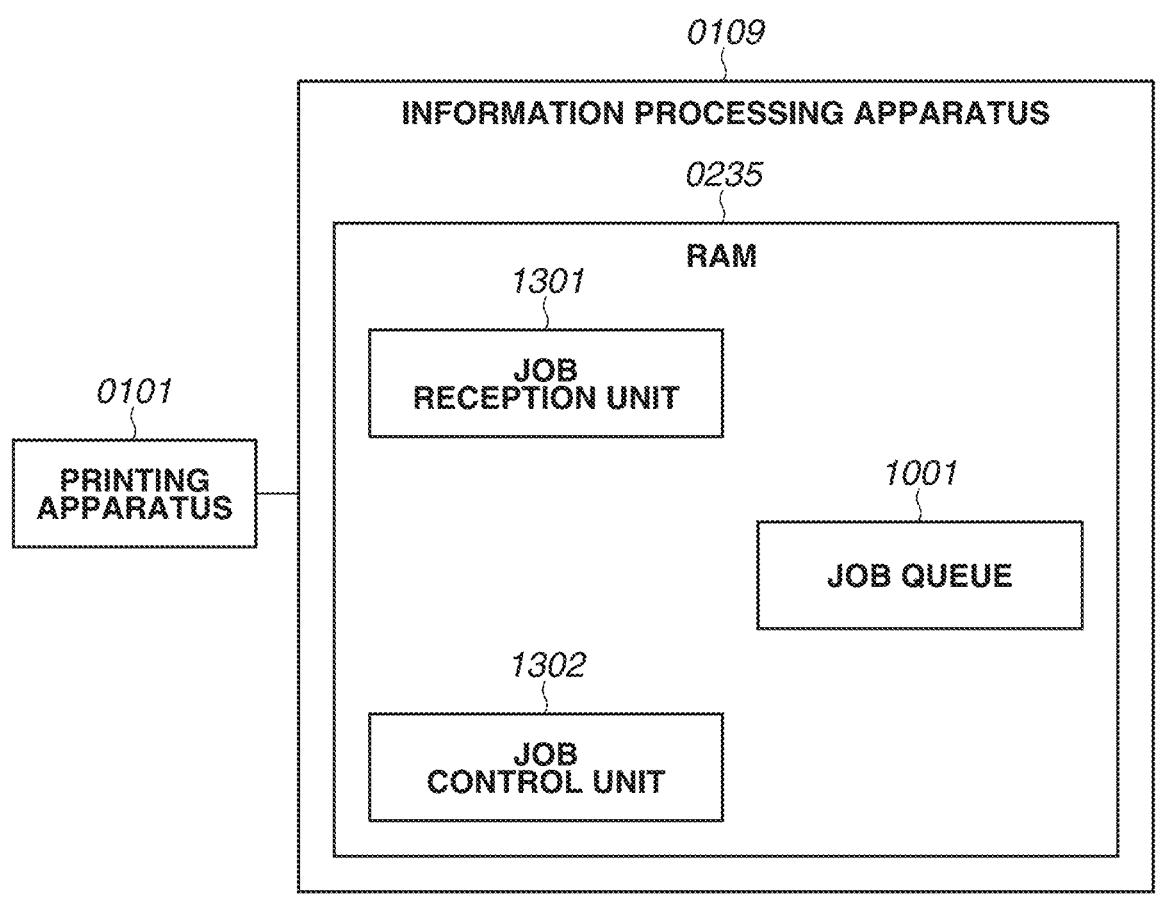
FIG. 13 is a diagram illustrating an example of a software configuration of the information processing apparatus.

FIG. 13 illustrates a software configuration of the information processing apparatus 0109 of the inspection system according to the present exemplary embodiment. The software configuration is implemented by the CPU 0234 loading programs and data stored in the storage unit 0236 into the RAM 0235 and executing the loaded programs and data.

A job reception unit 1301 registers, with a job queue 1001, jobs that are received from the client computer 0110 or via a job properties screen 0401 (described below).

The job queue 1001 is a queue structure for managing the received jobs and controlling the sequence of the jobs.

A job control unit 1302 dequeues a registered job from the job queue 1001 and transmits the job to the printing apparatus 0101 at appropriate timing.

FIG. 4 illustrates an example of a screen for setting job properties. The job properties screen 0401 is displayed on an operation unit (not illustrated) of the information processing apparatus 0109 and is configured to receive print job settings and a job execution instruction from the user.

In an inspection mode setting section 0402, an instruction as to whether a target print job is to be inspected is received from the user. If the user selects "OFF" for the inspection and presses a "PRINT" button 0406, the printing apparatus 0101 performs a normal printing operation. The normal printing operation is printing that does not involve an inspection operation. If the user selects "OFF" for the inspection, an inspection settings section 0403, a reference image setting section 0404, and an inspection operation setting section 0405 may be grayed out to prevent the user from making a selection, for example.

If the user selects "ON" for the inspection, the user subsequently sets the properties. In the present exemplary embodiment, a print job for which the inspection is set to "ON" is referred to as an "inspection job". In the inspection settings section 0403, the user selects an inspection region and an inspection level. When "DEFAULT" is selected, the inspection apparatus 0108 performs the inspection at a standard level with respect to the entire surface of the reference image. When "PRESET 1", "PRESET 2", "PRESET 3", "PRESET 4", or "PRESET 5" is selected, the inspection apparatus 0108 performs the inspection based on the corresponding inspection settings that are prestored in the storage unit 0228 of the inspection apparatus 0108. When "NEW REGISTRATION" is selected, new inspection settings can be generated and registered, and the inspection can be performed based on the new inspection settings.

In the reference image setting section 0404, a reference image is selected. When "NEW REGISTRATION" is selected, the inspection apparatus 0108 receives an RIP image generated by the information processing apparatus 0109 and registers a reference image based on the received RIP image. When "PRESET 1", "PRESET 2", "PRESET 3", "PRESET 4", or "PRESET 5" is selected, the inspection apparatus 0108 performs the inspection by using the corresponding reference image that is prestored in the storage unit 0228 of the inspection apparatus 0108.

In the inspection operation setting section 0405, the user selects whether to perform either or both of the reference image registration and the printing operation for the target print job. When "REGISTRATION ONLY" is selected, only the reference image registration and the inspection settings for the target print job are performed by the inspection apparatus 0108. When "PRINTING ONLY" is selected, the printing by the printing apparatus 0101 and the inspection by the inspection apparatus 0108 are performed using a reference image registered in advance. When "PRINTING ONLY" is selected in the inspection operation setting section 0405, the inspection settings section 0403 and the reference image setting section 0404 are grayed out to prevent input from the user.

When "REGISTRATION & PRINTING" is selected, the operation to be performed when "REGISTRATION ONLY" is selected and the operation to be performed when "PRINTING ONLY" is selected, which are described above, are performed in succession. Finally, when the "PRINT" button 0406 is pressed, the printing and inspection operations are performed based on the settings input in the above-described setting sections 0402 to 0405. More specifically, when the "PRINT" button 0406 is pressed, the selected job is enqueued to the job queue 1001 illustrated in FIG. 10 (described below).

FIG. 5 illustrates an inspection status screen 0501 that is displayed on the display unit 0245 at the time of inspection.

The inspection status screen 0501 is displayed on the display unit 0245 and is configured to receive an instruction to execute or stop the inspection and to display the inspection status. An inspection button 0502 is configured to receive an instruction to execute or stop the inspection from the user. When the inspection button 0502 is pressed, the text string on the inspection button 0502 is changed to "STOP INSPECTION" and an inspection status 0503 is changed to "INSPECTION IN PROGRESS". When the inspection button 0502 is pressed again, the text string on the inspection button 0502 is changed to "START INSPECTION" and the inspection status 0503 is changed to "INSPECTION STOPPED". The text string on the inspection button 0502 and the inspection status 0503 are changed in a toggle manner each time the inspection button 0502 is pressed.

The inspection status screen 0501 displays the number of inspected sheets, the number of sheets whose inspection results are FAIL, the defect rate, and the numbers of occurrences of causes of the FAIL results in real time during the inspection. The number displayed with the text "ERROR" in the inspection status screen 0501 is the number of times when the inspection apparatus 0108 determines an error due to a time-out because the inspection is not completed within a predetermined inspection time and determines that the inspection result is equivalent to FAIL. In a FAIL results list 0504, each time the inspection result is determined to be FAIL, the sheet number of the sheet with the FAIL result, information indicating which side (front or back) of the sheet has caused the FAIL result, the cause of the FAIL result, the inspection date and time, and a link to a FAIL result details screen (not illustrated) are added. When the link named "DETAILS" is clicked, the display unit 0245 displays a screen on which the user can view a captured image that is determined to be FAIL, a defect position in the image, and the like. In the present exemplary embodiment, examples of the causes of the FAIL results include misalignment, circular defects (dots), and linear defects (streaks). More specifically, misalignment refers to a state where, when the scanned image and the reference image are compared, the scanned image is misaligned entirely or partially. A circular defect refers to a state where a stain is generated in dot form only on the scanned image. A linear defect refers to a state where a stain is generated in streak or line form only on the scanned image.

In this manner, the inspection apparatus 0108 can determine the type of a detected defect based on the characteristics of the defect and display the type in the FAIL results list 0504. The types of defects that can be detected by the inspection apparatus 0108 are not limited to the above-described examples. For example, if the scanned image is in a state where the whole or a part of an image drawn on the reference image is not drawn on the scanned image, the inspection apparatus 0108 may determine that an image void occurs and the inspection result is FAIL.

Processing that is a feature of the present exemplary embodiment will be described with reference to flowcharts in FIGS. 6 to 8.

Programs for the printing apparatus 0101 that are related to the flowcharts are stored in the storage unit 0205 of the printing apparatus 0101, loaded into the RAM 0202, and executed by the CPU 0201. Programs for the inspection apparatus 0108 that are related to the flowcharts are stored in the storage unit 0228 of the inspection apparatus 0108, loaded into the RAM 0227, and executed by the CPU 0226. Programs for the information processing apparatus 0109 that are related to the flowcharts are stored in the storage unit 0236 of the information processing apparatus 0109, loaded into the RAM 0235, and executed by the CPU 0234. Programs for the client computer 0110 that are related to the flowcharts are stored in the storage unit 0244 of the client computer 0110, loaded into the RAM 0242, and executed by the CPU 0243.

Figure 6:
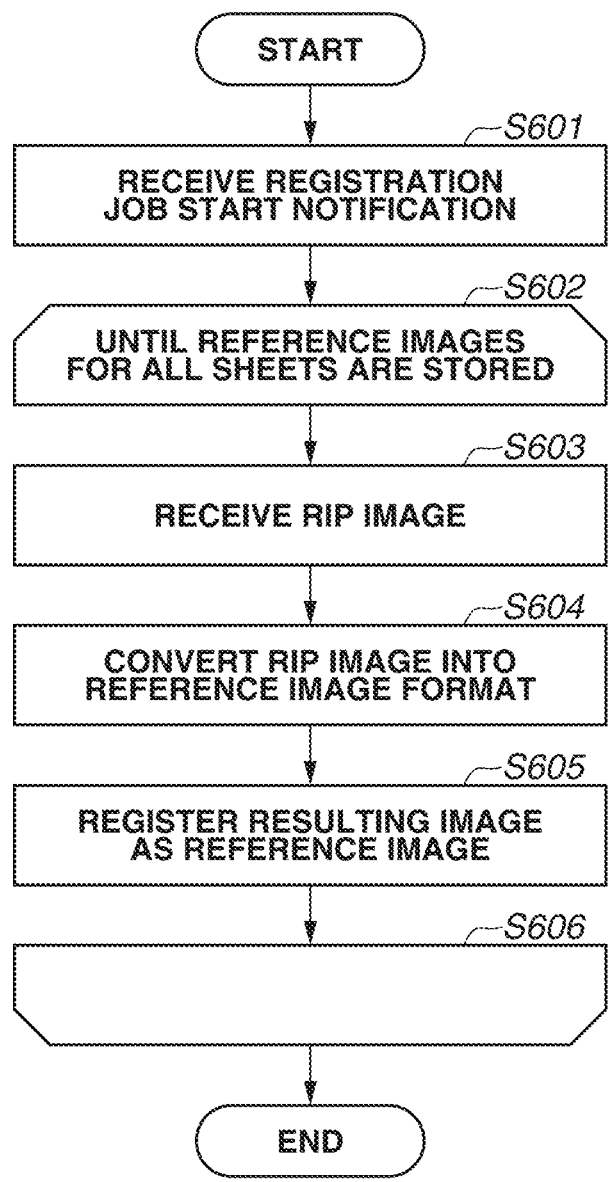
FIG. 6 is a flowchart illustrating a reference image registration operation by the inspection apparatus according to a first exemplary embodiment.

FIG. 6 is a flowchart illustrating an operation performed by the inspection apparatus 0108 to register a reference image for inspection.

The inspection apparatus 0108 performs the reference image registration by receiving an RIP image that is generated based on a print job and is transmitted by the information processing apparatus 0109 and registering a reference image based on the received RIP image. While in the present exemplary embodiment, the RIP image that is a source of reference image data is generated by the information processing apparatus 0109, the present exemplary embodiment is not limited thereto, and the RIP image may be generated by the printing apparatus 0101 or another apparatus.

In step S601, the inspection apparatus 0108 receives, from the information processing apparatus 0109, a notification that a reference image registration job is started, and the processing proceeds to step S602. In step S602, the processing is repeated until reference images for all the sheets (all the pages) in the job are stored in the storage unit 0228 of the inspection apparatus 0108.

In step S603, the inspection unit OF 0231 receives an RIP image from the information processing apparatus 0109 via the video cable 0241, the cable 0225, and the cable 0249. The transmission path of the RIP image is not limited thereto. For example, the information processing apparatus 0109 may be directly connected to the inspection apparatus 0108 via a network to transmit the RIP image.

In step S604, the CPU 0226 performs conversion processing, such as resolution conversion, to convert the received RIP image into a reference image format. In step S605, the CPU 0226 registers, as a reference image, an image obtained by the conversion processing in step S604 with the RAM 0227.

The processing then proceeds to step S606. The processing in steps S602 to S606 is repeated until the reference images for all the sheets (all the pages) are stored. After the reference images for all the pages are stored, the processing in the flowchart ends.

Figure 7:
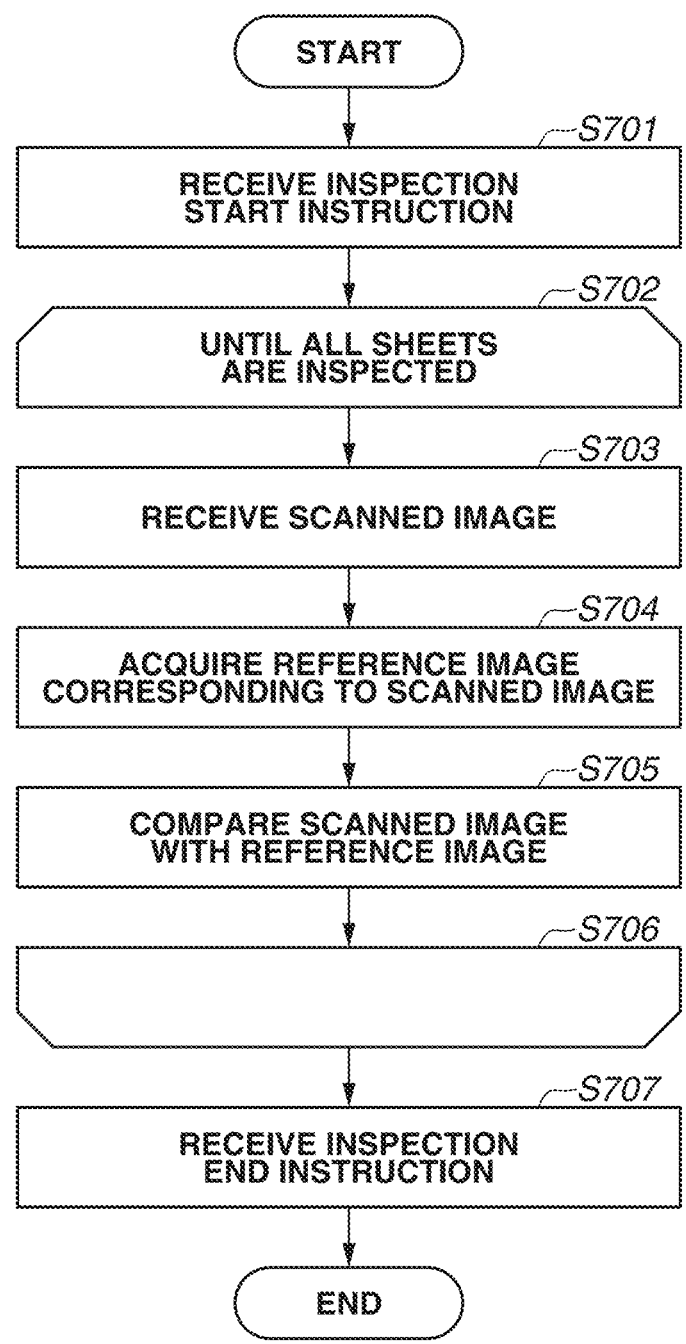
FIG. 7 is a flowchart illustrating an inspection operation by the inspection apparatus according to the first exemplary embodiment.

FIG. 7 is a flowchart illustrating an inspection operation performed by the inspection apparatus 0108. Processing in the flowchart is started when the printing apparatus 0101 receives a target print job from the information processing apparatus 0109.

In step S701, the CPU 0226 receives an inspection start instruction for the target print job, and the processing proceeds to step S702. If there is a sheet to be inspected, the processing proceeds to step S703.

In step S703, the inspection unit OF 0231 receives an image scanned by the CIS 0315 or 0316 from the inspection apparatus OF 0215. The scanned image is obtained by scanning a print product that is the print result of the print job, and the inspection apparatus 0108 performs the inspection by comparing the scanned image with the corresponding reference image that is pre-registered according to the flowchart of FIG. 6. In step S704, the CPU 0226 reads, from the RAM 0227, the reference image that is registered in step S604 and corresponds to the scanned image (the scanned page).

In step S705, the CPU 0226 compares the scanned image received as the inspection target in step S703 with the reference image read in step S704. In the comparison operation, first, the image positions of the reference image and the scanned image as the inspection target are aligned using characteristic points of the images as reference alignment points. Next, in the scanned image as the inspection target, the four corners of the sheet and the reference alignment points of the scanned image are analyzed to detect whether there is misalignment of the image with respect to the sheet.

Then, the density values of the reference image and the scanned image as the inspection target are compared on a pixel-by-pixel basis. As a result, if no difference is detected between the scanned image and the reference image, the inspection result is determined to be PASS. If a difference is detected between the scanned image and the reference image, the inspection result is determined to be FAIL, and the details of the FAIL result, which are described with reference to FIG. 5, are recorded based on the defect type.

The processing then proceeds to step S706. The processing in steps S702 to S706 is repeated until all the sheets in the job are inspected. After all the sheets are inspected, the processing proceeds to step S707. In step S707, the CPU 0226 receives an inspection end instruction from the user via the inspection button 0502 on the display unit 0245.

The processing in the flowchart illustrated in FIG. 7 is merely an example. For example, the inspection start instruction issued by the user on the display unit 0245 may be automatically executed in conjunction with a print start instruction issued on the printing apparatus 0101, the information processing apparatus 0109, or the client computer 0110. The inspection end instruction issued by the user on the display unit 0245 may also be automatically executed in conjunction with completion of the printing by the printing apparatus 0101, and the present exemplary embodiment is not limited to the above-described example.

An operation of processing a reference image registration job and an inspection job, which is performed by the information processing apparatus 0109 according to the present exemplary embodiment will now be described.

The job execution sequence will be described first with reference to FIG. 10. Print jobs that are set and executed via the job properties screen 0401 of the information processing apparatus 0109 are managed in the job queue 1001 that is arranged in the RAM 0235. A new job is enqueued (as indicated by an arrow 1002 in FIG. 10) to the end of the job queue 1001 by the job reception unit 1301. The job control unit 1302 executes the jobs in the order in which the jobs are dequeued (as indicated by an arrow 1003 in FIG. 10) from the job queue 1001. In the example of FIG. 10, a normal job 1008, a reference image registration job 1007, an inspection job 1006, a reference image registration job 1005, and a normal job 1004 are registered in this order from the head of the job queue 1001. In a case where "REGISTRATION & PRINTING" is selected in the inspection operation setting section 0405 of the job properties screen 0401 to execute a reference image registration job and an inspection job in succession, the reference image registration job and the inspection job are successively registered with the job queue 1001, like the reference image registration job 1007 and the inspection job 1006. In the present exemplary embodiment, a normal job refers to a print job that does not involve an inspection, i.e., a print job for which "OFF" is selected in the inspection mode setting section 0402 of the job properties screen 0401. An inspection job refers to a print job that involves an inspection, i.e., a print job for which "ON" is selected in the inspection mode setting section 0402.

Figure 8:
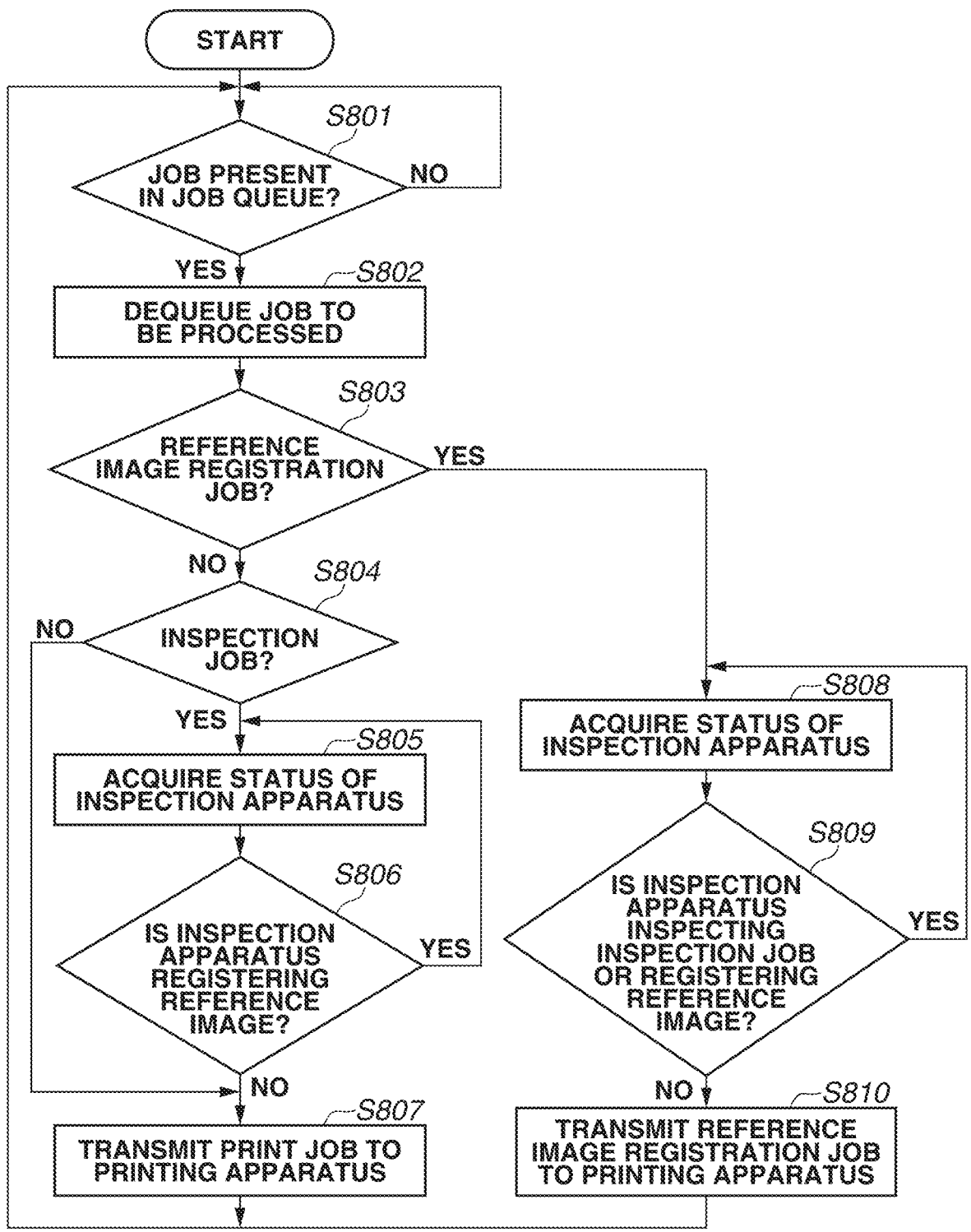
FIG. 8 is a flowchart illustrating a job execution control operation by the information processing apparatus according to the first exemplary embodiment.

FIG. 8 is a flowchart illustrating an operation of controlling the execution of the jobs registered with the job queue 1001, which is performed by the job control unit 1302 of the information processing apparatus 0109 according to the present exemplary embodiment.

In step S801, the job control unit 1302 determines whether there is a job registered with the job queue 1001. If there is no job in the job queue 1001 (NO in step S801), the job control unit 1302 waits for a new job to be enqueued to the job queue 1001 (as indicated by the arrow 1002 in FIG. 10). If there is a job registered with the job queue 1001 (YES in step S801), then in step S802, the job control unit 1302 dequeues, from the job queue 1001, the job to be processed next (as indicated by the arrow 1003 in FIG. 10). In step S803, the job control unit 1302 determines whether the dequeued job is a reference image registration job. If the job control unit 1302 determines that the dequeued job is a reference image registration job (YES in step S803), the processing proceeds to step S808. In step S808, the job control unit 1302 acquires the status of the inspection apparatus 0108. In step S809, the job control unit 1302 determines whether the inspection apparatus 0108 is inspecting a preceding inspection job or registering a preceding reference image. If the job control unit 1302 determines that the inspection apparatus 0108 is inspecting the preceding inspection job or registering the preceding reference image (YES in step S809), the processing returns to step S808 to wait until the inspection of the preceding inspection job or the registration of the preceding registration image is completed. After the inspection of the preceding inspection job or the registration of the preceding reference image is completed (NO in step S809), the processing proceeds to step S810. In step S810, the job control unit 1302 transmits the reference image registration job dequeued in step S802 to the printing apparatus 0101.

If the job control unit 1302 determines that the job dequeued from the job queue 1001 is a print job (NO in step S803), the processing proceeds to step S804. In step S804, the job control unit 1302 determines whether the print job is a normal job or an inspection job. If the job control unit 1302 determines that the print job is a normal job (NO in step S804), the processing proceeds to step S807. In step S807, the job control unit 1302 transmits the print job to the printing apparatus 0101. If the job control unit 1302 determines that the print job is an inspection job (YES in step S804), the processing proceeds to step S805. In step S805, the job control unit 1302 acquires the status of the inspection apparatus 0108. More specifically, the job control unit 1302 inquires of the printing apparatus 0101 about the job execution status of the inspection apparatus 0108. In response to the inquiry, the printing apparatus 0101 acquires the status of the inspection apparatus 0108 and notifies the information processing apparatus 0109 of the status. In this way, the information processing apparatus 0109 acquires information indicating which job is being executed by the inspection apparatus 0108. In the present exemplary embodiment, the status of the inspection apparatus 0108 is assumed to be acquired via the printing apparatus 0101, but the present exemplary embodiment is not limited thereto.

In step S806, the job control unit 1302 determines whether the inspection apparatus 0108 is registering the preceding reference image. If the job control unit 1302 determines that the inspection apparatus 0108 is registering the preceding reference image (YES in step S806), the processing returns to step S805 to wait to complete the registration of the preceding reference image. After the registration of the preceding reference image is completed (NO in step S806), the processing proceeds to step S807. In step S807, the job control unit 1302 subsequently executes the print job that is dequeued in step S802.

In steps S806 and S809 of the flowchart, the information processing apparatus 0109 polls (monitors) the status of the inspection apparatus 0108, thereby waiting to complete the preceding print job or the preceding reference image registration processing. However, the method for detecting a change of the status of the inspection apparatus 0108 is not limited thereto, and for example, the information processing apparatus 0109 may wait to receive a job end message (a job end event) from the inspection apparatus 0108.

A processing operation that is performed by the information processing apparatus 0109 in a case where the information processing apparatus 0109 uses the flowchart illustrated in FIG. 8 and the job queue 1001 is in the state illustrated (as an example) in FIG. 10 will now be described. First, the normal job 1008 that is registered at the head of the job queue 1001 is executed. Then, the reference image registration job 1007, which is the next registered job, is executed immediately since the inspection apparatus 0108 is not executing an inspection job. The inspection job 1006, which is the next registered job, is executed after the reference image registration job 1007 is completed. The reference image registration job 1005, which is the next registered job, is executed after the inspection job 1006 is completed. The normal job 1004, which is the next registered job, is executed immediately since it is unnecessary to wait to complete the reference image registration job 1005.

According to the first exemplary embodiment described above, the information processing apparatus 0109 controls the job execution timing, thereby enabling the inspection apparatus 0108 to exclusively execute the inspection processing and the reference image registration processing (i.e., preventing the inspection apparatus 0108 from executing the inspection processing and the reference image registration processing at the same time). Therefore, the processing capacity of the CPU 0226 and the RAM (the memory) 0227 that enables simultaneous execution of the inspection processing and the reference image registration processing is unnecessary, which produces the effect of enabling the provision of a low-cost inspection apparatus.

In the first exemplary embodiment, the information processing apparatus 0109 controls the job execution timing, thereby preventing the inspection apparatus 0108 from executing the inspection processing and the reference image registration processing at the same time. In a second exemplary embodiment, a case where the inspection apparatus 0108 discards (cancels) the reference image registration job to prevent simultaneous execution of the inspection processing and the reference image registration processing will be described with reference to a flowchart of FIG. 9. The flowchart of FIG. 9 illustrates a job execution control operation performed by the inspection apparatus 0108.

In step S901, the inspection apparatus 0108 waits to receive a job. The job that the inspection apparatus 0108 waits to receive in this step is an inspection job or a reference image registration job. If the inspection apparatus 0108 receives a job (YES in step S901), then in step S902, the inspection apparatus 0108 determines whether the received job is a reference image registration job. If the inspection apparatus 0108 determines that the received job is a reference image registration job (YES in step S902), then in step S903, the inspection apparatus 0108 determines whether an inspection job is being executed. If the inspection apparatus 0108 determines that no inspection job is being executed (NO in step S903), the processing proceeds to step S906. In step S906, the inspection apparatus 0108 executes the reference image registration job. If the inspection apparatus 0108 determines that an inspection job is being executed (YES in step S903), then in step S904, the inspection apparatus 0108 cancels (discards) the received reference image registration job, and the processing proceeds to step S905. In step S905, the inspection apparatus 0108 continues the inspection job that is currently being executed. In a case where the inspection apparatus 0108 cancels the reference image registration job, the inspection apparatus 0108 displays an error message 1101 illustrated in FIG. 11 on the job properties screen 0401 of the information processing apparatus 0109 in order to notify the user that the reference image registration job is canceled. The method for notifying the user that the reference image registration job is canceled is not limited thereto, and any method, such as displaying the error message 1101 on the inspection status screen 0501 of the inspection apparatus 0108, may be used.

If the inspection apparatus 0108 determines that the received job is an inspection job (NO in step S902), the processing proceeds to step S907. In step S907, the inspection apparatus 0108 determines whether a reference image registration job is being executed. If the inspection apparatus 0108 determines that no reference image registration job is being executed (NO in step S907), the processing proceeds to step S909. In step S909, the inspection apparatus 0108 executes the received inspection job. If the inspection apparatus 0108 determines that a reference image registration job is being executed (YES in step S907), then in step S908, the inspection apparatus 0108 terminates the reference image registration processing being executed, cancels the reference image registration job (discards the reference images being registered, including a registered reference image), and preferentially executes the received inspection job.

As described above, according to the present exemplary embodiment, in a case where the inspection apparatus 0108 receives a reference image registration job while executing an inspection job or in a case where the inspection apparatus 0108 receives an inspection job while executing a reference image registration job, the inspection apparatus 0108 cancels the reference image registration job to prevent simultaneous execution of the inspection job and the reference image registration job. As a result, the processing capacity of the CPU 0226 and the RAM (the memory) 0227 that enables simultaneously execution of the inspection job and the reference image registration job is unnecessary, which produces the effect of enabling the provision of a low-cost inspection apparatus.

According to the exemplary embodiments of the present invention, it is possible to provide an inspection system that performs exclusive control of a reference image registration job and an inspection job, thereby ensuring printing performance and enabling inspection processing even with a low-cost inspection apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-001486, filed Jan. 10, 2023, which is hereby incorporated by reference herein in its entirety.

What is claimed is:

1. An information processing apparatus communicably connected via a printer to an inspection apparatus, the inspection apparatus including at least one processor configured to perform an inspection of a print product, the information processing apparatus comprising:
   a user interface configured to receive an input from a user;
   one or more processors; and
   one or more memories storing one or more programs including instructions, which when executed by the one or more processors, cause the information processing apparatus to:
      receive a first job execution instruction based on one or more inputs received via the user interface;
      transmit, to the printer, a first job for registering a reference image to be used in the inspection; and
      transmit, to the printer, a second job for printing an image corresponding to the reference image on a recording sheet,
      wherein, in a case where the first job execution instruction is received while the inspection apparatus is inspecting a print product that is produced by the printer that has executed the second job that precedes the first job and corresponds to a second job execution instruction different from the first job execution instruction, the first job is not transmitted until the preceding second job is completed by the inspection apparatus.

2. The information processing apparatus according to claim 1, wherein, in the case where the first job execution instruction is received while the inspection apparatus is inspecting the print product that is produced by the printer that has executed the preceding second job, the first job is transmitted after the preceding second job is completed.

3. The information processing apparatus according to claim 1, wherein the instructions, when executed by the one or more processors, further cause the information processing apparatus to receive a job execution status of the inspection apparatus from the printer, and
   wherein, in a case where the received job execution status indicates that the preceding second job is being executed, the first job is not transmitted.

4. The information processing apparatus according to claim 1, wherein the instructions, when executed by the one or more processors, further cause the information processing apparatus to receive a job execution status of the inspection apparatus from the printer, and
   wherein, in a case where the received job execution status indicates that the first job is being executed, the second job is not transmitted.

5. The information processing apparatus according to claim 1, wherein the second job is transmitted in a case where a notification indicating that the first job is completed is received from the printer.

6. The information processing apparatus according to claim 1, wherein the information processing apparatus includes a job queue for job management, and
   wherein, based on the first job execution instruction being received, a job corresponding to the first job execution instruction is added to the job queue.

7. A control method for an information processing apparatus communicably connected via a printer to an inspection apparatus, the inspection apparatus including at least one processor configured to perform an inspection of a print product, the information processing apparatus including a user interface configured to receive an input from a user, the control method comprising:
   receiving a first job execution instruction based on one or more inputs received via the user interface;
   transmitting, to the printer, a first job for registering a reference image to be used in the inspection; and
   transmitting, to the printer, a second job for printing an image corresponding to the reference image on a recording sheet,
   wherein, in a case where the first job execution instruction is received while the inspection apparatus is executing the second job that precedes the first job and corresponds to a second job execution instruction different from the first job execution instruction, the first job is not transmitted until the preceding second job is completed.

8. An inspection apparatus configured to receive jobs from an information processing apparatus via a printer, the inspection apparatus comprising:
   one or more processors; and
   one or more memories storing one or more programs including instructions, which when executed by the one or more processors, cause the inspection apparatus to:
      receive a first job for registering image data as a reference image;

perform registration processing to register the image data on the received first job as the reference image; and in a case where a scanned image obtained by scanning a print product is received, perform inspection processing on the print product based on the scanned image and the reference image, wherein, in a case where a second job for registering image data as a reference image is received during the inspection processing, registration processing is not performed on the image data on the second job.

9. The inspection apparatus according to claim 8, wherein, in the case where the second job is received during the inspection processing, the received second job is canceled.

10. The inspection apparatus according to claim 8, wherein, in the case where the second job is received during the inspection processing, the registration processing is not performed on the image data on the second job and the image data on the second job is discarded.

11. The inspection apparatus according to claim 9, wherein, in a case where the second job is canceled, the information processing apparatus is notified that the second job is canceled.

12. The inspection apparatus according to claim 8, wherein, in the inspection processing, the print product is inspected for stains based on a comparison between the scanned image and the reference image corresponding to the scanned image.

13. The inspection apparatus according to claim 8, wherein, in a case where an inspection job for issuing an instruction to start inspection processing is received during the registration processing, the registration processing is terminated and the inspection processing is started.

14. The inspection apparatus according to claim 8, wherein the registration processing is processing for storing the image data together with identification information, such as a reference image identifier (ID), into a storage unit.

15. A control method for an inspection apparatus configured to receive jobs from an information processing apparatus via a printer, the control method comprising:

receiving a first job for registering image data as a reference image;

performing registration processing to register the image data on the received first job as the reference image; and in a case where a scanned image obtained by scanning a print product is received, performing inspection processing on the print product based on the scanned image and the reference image, wherein, in a case where a second job for registering image data as a reference image is received during the inspection processing, registration processing is not performed on the image data on the second job.

16. An information processing apparatus communicably connected to a print inspection apparatus, the print inspection apparatus including at least one processor configured to perform inspection processing on a print product, the information processing apparatus comprising:

a user interface configured to receive an input from a user;

one or more processors; and one or more memories storing one or more programs including instructions, which when executed by the one or more processors, cause the information processing apparatus to:

receive a first job execution instruction based on one or more inputs received via the user interface;

transmit, to the print inspection apparatus, a first job for registering a reference image to be used in the inspection processing; and transmit, to the print inspection apparatus, a second job for printing an image corresponding to the reference image on a recording sheet and performing the inspection processing, wherein, in a case where the first job execution instruction is received during inspection processing that is based on the second job that precedes the first job and corresponds to a second job execution instruction different from the first job execution instruction, the first job is not transmitted until the preceding second job is completed.

* * * * *